(No Model.)

J. C. SIMPSON.
HORSESHOE NAIL.

No. 310,231. Patented Jan. 6, 1885.

Witnesses
Geo. H. Strong.
J. H. Nourse.

Inventor
J. C. Simpson
By Dewey & Co.
Attorneys

United States Patent Office.

JOSEPH CAIRN SIMPSON, OF OAKLAND, CALIFORNIA.

HORSESHOE-NAIL.

SPECIFICATION forming part of Letters Patent No. 310,231, dated January 6, 1885.

Application filed August 10, 1883. (No model.)

*To all whom it may concern:*

Be it known that I, JOSEPH C. SIMPSON, of the city of Oakland, county of Alameda, and State of California, have invented an Improvement in Horseshoe-Nails; and I hereby declare the following to be a full, clear, and exact description thereof.

My invention relates to certain improvements in horseshoe-nails; and it consists of a form which will be more fully explained by reference to the accompanying drawings, in which—

Figure 1:
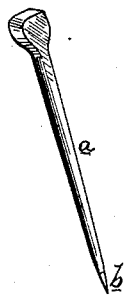
Figure 2:
Figure 3:

Figure 1 is a view of the nail, showing its convex side. Fig. 2 is a view showing the concave side. Fig. 3 is an enlarged transverse section to show more clearly the concavity and convexity of the nail.

This class of nails are usually made from the best and softest iron obtainable, in order to give them sufficient ductility to form a proper clinch; but this very softness makes them difficult to drive, and in addition to this, when cold-pressed, they become fibrous, so as to be easily split, in which case the horse's foot may be seriously wounded when they are driven.

I form my improved nail of prepared steel having sufficient ductility to form a clinch without breaking. The advantages are greater strength and stiffness, which makes them easier to drive, and less liable to be deflected or diverted from their course.

To prepare my nails and give them the increased tenacity and ductility necessary, I heat the steel to a cherry-red in a charcoal-fire, and then cool it slowly. Prepared in this way a much lighter and smaller nail may be made than from iron or other material, and it will not injure the horse so much as a nail of the ordinary size. There is also less danger of crystallization, and the metal, being firm and more homogeneous, is not likely to split, as before described.

To still further improve my nail, I form it with one side convex and nearly semicircular, as shown at *a*, and with the other side concave, the concavity extending from a suitable distance below the head nearly to the point, so that the concaved portion will always extend entirely through the hoof and appear upon the upper side and be clinched thereon, whether the nail be driven near the edge or away therefrom. The convex side is toward the inside when driven. That part which passes through the metal of the shoe is of the same shape as the punch by which the nail-holes are made, and the point is slightly flattened and beveled off, as shown at *b*, so as to insure its passing out through the enamel when driven. By this construction the nail cuts away a smaller proportion of the horn of the hoof when driven and leaves it in better shape.

In order to facilitate the clinching of the nail after it is driven, the outer side, where it is to be turned over, is made slightly concave, as shown at *c*, so that when it is turned over the edges of the concaved portion will be embedded into the surface of the horn, and will lie close and smooth, and the convex surface will be less likely to wound the opposite leg if it should be struck.

Having thus described my invention, what I claim as new, and desire to secure by Letters Patent, is—

A horseshoe-nail having one side made convex and the other concave for a part of its length, substantially as herein described.

In witness whereof I have hereunto set my hand.

JOSEPH CAIRN SIMPSON.

Witnesses:
C. D. COLE,
J. H. BLOOD.